United States Patent Office 2,923,724
Patented Feb. 2, 1960

2,923,724

PROCESS OF PREPARING ESTER TYPE ANIONIC SURFACE ACTIVE AGENTS

Robert J. Anderson, Elizabeth, and Leslie M. Schenck, Westfield, N.J., assignors to General Aniline & Film Corporation, New York, N.Y., a corporation of Delaware No Drawing. Application August 10, 1956
Serial No. 603,214

6 Claims. (Cl. 260—400)

The present invention relates to an improved process of preparing salts of ester type compounds from carboxylic acids and 2-hydroxyalkane sulfonic acids.

The reaction of fatty acids with 2-hydroxyalkane sulfonic acids and the alkali metal salts thereof to yield anionic surface active materials useful as wetting, cleansing, softening and dispersing agents is well known. In one process one mole of a water-soluble, 2-hydroxyalkane sulfonic acid is reacted with less than 1 and more than 0.6 mole of a fatty acid at a temperature of 200–300° C. and at sub-atmospheric pressure for a sufficient period of time, considered as four hours or more, to complete the reaction. Precautions are necessary to maintain an inert atmosphere with nitrogen or carbon dioxide to provide maximum assurance of a light colored product when subjecting these intermediates to prolonged high temperature conditions.

In still another process, one mole of a fatty acid is condensed with one mole of 2-hydroxyalkane sulfonic acid at a temperature of about 220° C., but no advantage was found for the acid chloride method disclosed in U.S.P. 1,932,180. The time of dehydration can be decreased if the temperature, depending upon the fatty acid employed, is quickly increased to 250–260° C. or higher near the end of the reaction while employing a vacuum around 15 mm. of mercury. In the latter case, however, a small amount of the fatty acid distills over with the water formed during the dehydration reaction. To promote the dehydration reaction, about 10 percent anhydrous sodium sulfate may be added to the reaction mixture. After the distillation of the fatty acid and the water formed the final product after cooling is a solid soap mixture capable of being ground.

We have found that the disadvantages inherent in the foregoing processes can be readily overcome by heating at a temperature of 185–300° C., preferably between 185–210° C., a carboxylic acid with an alkali metal, alkaline earth metal or a tertiary amine salt of a 2-hydroxyalkane sulfonic acid in the presence of about 2 to 2½% of the weight of the carboxylic acid of a phosphorus containing compound such as, for example, o-phosphoric acid, meta phosphoric acid, hypophosphoric acid, phosphorous acid, dihydrogen sodium phosphate, etc., as a catalyst at the usual essentially atmospheric pressure conditions under an inert atmosphere of nitrogen, carbon dioxide, or equally satisfactory steam, either saturated or superheated. It is to be noted that with regard to pressure, we prefer to employ essentially atmospheric pressure, despite the fact that the process is equally operable at sub-atmospheric.

The carboxylic acid may be employed from 1 to 10 moles per 1 mole of 2-hydroxyalkane sulfonic acid in the form of an alkaline metal, alkaline earth metal, or a tertiary amine salt.

By the employment of a phosphorus containing compound as a catalyst, it is not necessary to resort to the employment of sub-atmospheric pressures. In fact, sub-atmospheric pressures are undesirable and may lead to the formation of undesirable by-products. Another advantage of our process is that the reaction rate of the carboxylic acid with the alkali metal, alkaline earth metal, or tertiary amine salt with 2-hydroxyalkane sulfonic acid is considerably accelerated when the pH range of the reaction mixture is maintained at a pH of 2.0 to 5, preferably at 2.8 to 3.2. Although the carboxylic acid ratio may be increased to the magnitude of 10:1 molar ratio with no undesirable results, we prefer, however, a minimum ratio of one mole of carboxylic acid to one mole of an alkali metal, an alkaline earth metal, or a tertiary amine salt of 2-hydroxyalkane sulfonic acid. An essential, in fact, a critical feature of the process of the present invention is the presence of a phosphorus containing compound as a catalyst. With this catalyst the reaction time for the formation of the ester type anionic agents is not only shortened, but also promotes the reaction at lower temperatures, i.e. between 185–210° C. with a resultant product having superior color values. Normally, the reaction time of ½ to 2 hours is sufficient to complete the esterification reaction, and provides a basis for a continuous process.

A salt free product is prepared at a mole ratio of one of carboxylic acid to one of the salt of a 2-hydroxyalkane sulfonic acid. Inasmuch as an excess of a monocarboxylic acid may be employed as high as 10 moles per one mole of the salt of a 2-hydroxyalkane sulfonic acid, the final product will inherently contain some free carboxylic acid but no inorganic salt other than that introduced by the catalyst. As a result thereof, the final product in the latter case is particularly adaptable for built-soap bar type formulations, skin creams, lotions, salves, and the food products, as foaming agents, and other uses wherein the presence of more than traces of a mineral acid salt of an alkali metal, alkaline earth metal or tertiary amine is undesirable.

Inasmuch as the reaction is carried out at atmospheric pressure, steam or an inert gas mentioned above may be passed through the reaction mixture to assist the removal of the water formed.

As examples of monocarboxylic acids which may be employed in the esterification reaction any carboxylic acid of at least 8 carbon atoms, whether saturated, unsaturated, aliphatic, aromatic, or cyclic aliphatic may be employed, the nature and character of the acid is immaterial as long as it contains a monocarboxylic acid group. Acids of this type include: caprylic, pelargonic, capric, lauric, myristic, palmitic, stearic, oleic, linoleic, linolenic, lauronolic, and cycloalkane or heptane carboxylic, o- or m-toluic, cumic, phenylacetic, etc., tall oil acid, hydrogenated tall acids, hydrogenated tallow acids, naphthenic acids, abietic acids, and the like, etc. In addition alkyl benzoic acids such as, dodecylbenzoic acid, nonylbenzoic acid, octylbenzoic acid, alkylnaphthoic acids such as nonylnaphthoic acid, acids from oxo alcohols and aldehydes, acids from oxidized petroleum fractions, etc. may be employed. Acid mixtures from various natural plant and animal oils such as: olive, tallow, castor, peanut, coconut, soybean, cottonseed, ucahubs, linseed; fish oils such as: cod, herring, menhaden, etc., neat's-foot, sperm, palm, corn, butter, babassu, kapok, hempseed, mustard, rubberseed, rape, safflower, sesame etc. may also be employed.

The 2-hydroxyalkane sulfonic acid salts that are condensed with the foregoing monocarboxylic acids are characterized by the following general formula:

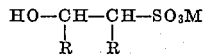

wherein R represents either hydrogen, methyl or ethyl, and M represents an alkaline earth metal, e.g. calcium, magnesium, barium; alkali metal, e.g. lithium, sodium, potassium; or a tertiary amine, e.g. trioctylamine, N,N-diphenylmethylamine, N,N-dimethyloctadecylamine, etc. Highly hindered secondary amines may also be employed, especially those which do not readily form amides with fatty acids.

As examples of 2-hydroxyalkane sulfonic acids that are reacted in the form of their salts with the above monocarboxylic acid to form acid type anionic surface active agents the following are illustrative:

Isethionic acid
2-hydroxy-propane-sulfonic acid
2-hydroxy-3-butane-sulfonic acid
2-hydroxy-1-butane-sulfonic acid The above 2-hydroxyalkane sulfonic acids are employed in the form of their sodium, potassium, calcium, magnesium etc., or secondary or tertiary amino salts. The salts are readily prepared by neutralization of the acid with an equivalent amount of an alkali metal, alkaline earth metal, hydroxide or carbonate, or secondary or tertiary aliphatic or aromatic amines, such as, for example:

N,N-diphenylmethylamine
Trioctylamine
N,N-dimethyloctadecylamine
N,N-dioctadecylethylamine
N,N-dihexadecylmethylamine The 2-hydroxyalkane sulfonic acid salts may be used as aqueous solutions or as dry powders. In the former case, the water is removed during the reaction in the presence of a monocarboxylic acid.

The products obtained by this process are valuable anionic surface active agents and have many varied commercial uses. The most conspicuous property of these products is their great activity at surfaces and interfaces which promotes their use in a large field of the technical arts. For instance, they can be used as wetting, frothing, or washing agents in the treating and processing of textiles; for converting liquid or solid substances which per se are insoluble in water (such as hydrocarbons, higher alcohols, oils, fats, waxes, and resins) into creamy emulsions, clear solutions or fine stable dispersions; for carbonizing; for dyeing; for the pasting of dyestuffs; for fulling, sizing, impregnating and bleaching treatments; as cleansing agents in hard water; in tanning and mordanting processes; for dyeing acetate with insoluble dyestuffs; for the preparation of dyestuffs in finely divided form; for dispersible dye powders; for producing foam for fire extinguishers; as a means for improving the absorptive power of fibrous bodies; and as an aid in softening hides and skins.

In addition, these products are valuable emulsifiers for insecticidal compositions and agricultural sprays such as DDT, 2,4-D, toxaphene, chlordane, dormant or mineral oil sprays, nicotine sulfate, methoxychlor, etc. and are effective dispersants for pesticidal powders, such as those containing the above toxicants.

These products are also valuable for use as additives to petroleum products, such as fuel oils, lubricating oils, greases, and as additives to the water or brine used for oil recovery from oil-bearing strata by flooding techniques.

Other valuable uses are in metal cleaning compositions; dry cleaning compositions; additives for rubber latices; foam inhibitors for synthetic rubber latex emulsions; froth flotation agents; additives for road building materials; as air entraining agents for concrete or cement; additives to asphalt composiitons; plasticizers and modifiers for vinyl plastics; alkyd resins; phenol-formaldehyde resins and other types of polymeric-type plastic materials; for incorporation into adhesives, paint, linoleum; for use in bonding agents used in various insulating and building materials; as refining aids in wood digesters to prepare pulp; as additives to pulp slurries in beating operations to prevent foaming and also to aid the beating operation in papermaking; and as aids in the preparation of viscose dope.

The products are also useful as emulsifiers for emulsion polymerization, as mercerizing assistants, wetting agents, rewetting agents, dispersing agents, detergents, penetrating agents, softening agents, lime soaps dispersants, dishwashing agents, anti-static agents, disinfectants, insecticides, moth-proofing agents, bactericides, fungicides and biocides. They are valuable as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

The products are especially useful in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals especially ferrous metals, in acid pickling baths, in acid cleaning compositions, and in electro-plating baths. Other valuable uses are as solvents or in solvent compositions, as cleaning agents for paint brushes, as additives for paints, lacquers, and varnishes; as lubricants, as greases and stuffing agents.

The products may be employed in the preparation of skin creams, lotions, salves and other cosmetic preparations such as home hair-wave sets, shaving creams, shampoos, toothpastes, etc. They may also be employed in food products, as foaming agents, emulsifying agents, and softening agents.

They may be used as aids in conditioning of soil; as aids in the grinding, milling or cutting of metals either in aqueous solution, emulsions or in oils; as aids in the fixing of dyes to leather and natural or synthetic fibers; as aids in level dyeing of fibers; as aids in stimulating plant growth; as an additive to cement to improve the strength of the resulting concrete or to improve its hardening time or its resistance to freezing and thawing or scaling; and as curing aids and penetrants for use in fertilizer.

The following examples will further illustrate the nature of the improved process which, however, is not to be considered as being limitative thereof. The parts given are all by weight.

The following two examples, one utilizing the reactive components but without a catalyst and one with boric acid as a catalyst are given for comparison.

Example I may be considered under optimum conditions when no catalyst is used. Example II shows the use of boric acid as a catalyst and the results obtained therefrom.

*Example I*

Into a one liter flask equipped with an efficient agitator, thermometer and steam-jacketed condenser set downward for distillation, were placed 245 parts of coconut oil fatty acid. The fatty acid was heated to 200° C. There was then rapidly added 115 parts of sodium isethionate. The mixture was then heated to 210° C. under an inert atmosphere of carbon dioxide for two hours. The pH of the reaction mixture was 5. A wet sample at this point showed that the reaction contained 20% of active material by methylene blue analysis, and an aqueous solution of the material has a pH of 5. The reaction rate was approximately 34% at the end of 3½ hours heating period.

*Example II*

Example I was repeated with the exception that 7.4 grams of boric acid was employed as a catalyst and the pH of the reaction mixture was 6.6. The percent activity in this reaction was 23% at the end of two hours, and 55% at the end of 4 hours heating.

Example III

Into a one liter flask equipped with an efficient agitator, thermometer and steam jacketed condenser set downward for distillation were charged 245 parts of coconut oil fatty acid. The fatty acid was warmed to 90° C. and to it a solution of 24.5 parts of water and 7.4 parts of 85% o-phosphoric acid were added. The mixture was heated to 200° C. in an inert atmosphere of carbon dioxide and then there were added rapidly 115 parts of sodium isethionate. The temperature was raised to 210° C. and maintained for 1 hour. A wet sample at this point showed that the reaction contained 64% active material by methylene blue analysis and an aqueous solution of the material has a pH of 2.75. The final product was neutralized to a pH of 7 by the addition of 7.9 parts of sodium hydroxide, cooled and ground to a white powder. The detergent mixture foamed freely in water and exhibited excellent detergent properties.

The analysis of the product is as follows:

| | |
|---|---|
| Anionic surface active agent _____percent__ | 62.2 |
| Coconut oil fatty acid _____do____ | 22.4 |
| Inert extractable material _____ | 1.0 |
| Reflectance _____ | 87.8 |
| Yellow index _____ | 14.3 |

The determination of active anionic surface active agent in the foregoing analysis was made by the methylene blue method described in Nature, 160, p. 759 (1947), and Trans. Faraday Soc., 44, pp. 226-239 (1948).

The coconut oil fatty acid was determined by extraction with petroleum ether and titration of the petroleum ether residue.

The inert extractable material was determined from the weight of the petroleum ether residue by subtracting the coconut oil fatty acid.

The low pH catalysis in the foregoing example permitted the reaching of a greater state of activity, which is an indication of the completeness of the reaction, in one hour as compared with the lesser state of activity attained in 3½ and 4 hours in Examples I and II inclusive. This feature substantially makes the process economical, and provides a product of better color and purity since both reactants are subject to thermal decomposition when maintained at elevated temperatures for prolonged periods of time, particularly when employing sub-atmospheric pressures.

Example IV

While employing the same equipment as in Example III, 240 parts of lauric acid were added to the one liter flask. The acid was heated at 100° C. and a solution of 24 parts of water and 8.45 parts of 85% o-phosphoric acid were added. The inert atmosphere was maintained by passing nitrogen through the reaction mixture. The mixture was heated to 200° C. and then rapidly 118.5 parts of sodium isethionate added. At the end of two hours of heating at 200-210° C. a sample of the white product had a pH of 2.9 and contained 65.1% active detergent by methylene blue analysis. Upon cooling, the product was neutralized with sodium carbonate and ground to a white powder with excellent detergent properties.

Example V

While employing the same equipment as in Example III, 210 parts of coconut fatty acid was melted in the one liter flask at 100° C. To the melted fatty acid a solution of 8.5 parts of 85% o-phosphoric acid in 21 parts of water were added and the mixture heated to 200° C. while maintaining an inert atmosphere by passing nitrogen through the reaction mixture. At this point, there was added 118.5 parts of sodium isethionate. The reaction mixture is then rapidly heated to 220° C. and held at 220° C. for one-half hour to complete the reaction. Following neutralization with sodium bicarbonate, the product was ground to produce a white powder of satisfactory detergent properties containing 66.6% of active material by methylene blue analysis together with sodium coco acid soaps.

Example VI

Into a one liter flask equipped with an efficient stirrer, thermometer and steam jacketed condenser set downward for distillation, 300 parts of stearic acid and 9.4 parts of 86% o-phosphoric acid were added. The mixture was heated to 200° C., and there is added as rapidly as possible at 200° C. a solution of 110 parts of sodium isethionate dissolved in 230 parts of water, allowing the steam to escape. When the addition was complete the reaction mixture was held at 200-210° C. for one hour, and the molten product flaked. There was obtained a white detergent with 62.1% activity by the methylene blue analysis which exhibits desirable surface active properties.

Example VII

Example III was repeated with the exception that the carbon dioxide was replaced by saturated steam at 100° C. and atmospheric pressure.

Example VIII

Example IV was repeated with the exception that the nitrogen was replaced by superheated steam at 205° C. and atmospheric pressure to provide the inert atmosphere.

Example IX

Employing the equipment of Example I, 245 parts of coconut fatty acid was added to the one liter flask and heated to the melting point. Then 30 parts of water and 8 parts of 88% o-phosphoric acid added. The mixture was heated to 190° C. and then there was added to the mixture over several minutes 125 parts of sodium β-methylisethionate. The reaction mixture was heated at 190° C.–200° C. for fifty minutes to produce an activity of 62.9% by methylene blue analysis. The product after neutralization from a pH of 3.1 to a pH of 7 with sodium carbonate operates very satisfactorily as a detergent in all ordinary applications.

Example X

Example III was repeated with the exception that the sodium isethionate was replaced by an equivalent amount of the potassium salt of 2-hydroxypropane sulfonic acid.

Example XI

Example IV was repeated with the exception that the sodium isethionate was replaced by an equivalent amount of trioctyl amine salt of 2-hydroxy-1-butane sulfonic acid.

Example XII

Example V was repeated with the exception that the sodium isethionate was replaced by an equivalent amount of sodium salt of 2-hydroxy-1-butane sulfonic acid.

Example XIII

Example III was repeated with the exception that 7.4 parts of o-phosphoric acid were replaced with 5.9 parts dihydrogen sodium phosphate with equally satisfactory results.

Example XIV

Example IV was repeated with the exception that 8.45 parts of 85% o-phosphoric acid were replaced with 5 parts of o-phosphorus acid with substantially identical results.

We claim:

1. The process of preparing ester type anionic surface active agents which comprises heating at a temperature of 185-300° C. in the presence of an inert atmosphere, selected from the group consisting of carbon dioxide, nitrogen, steam, saturated steam and superheated steam, and also of a phosphorus containing compound selected from the group consisting of o-phosphoric acid, m-phosphoric acid, hypophosphoric acid, phosphorus acid and sodium dihydrogen phosphate as a catalyst and to maintain the pH from 2.8 to 3.2, 1 to 10 moles of monocarboxylic fatty acid of from 8 to 22 carbon atoms with 1 mole of a 2-hydroxyalkane sulfonic acid having the following formula:

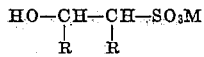

wherein R represents a member selected from the group consisting of hydrogen and lower alkyl groups and M represents the cation selected from the class consisting of alkali and alkaline earth metals.

2. The process according to claim 1 wherein the 2-hydroxyalkane sulfonic acid salt is sodium isethionate.

3. The process according to claim 1 wherein the 2-hydroxyalkane sulfonic acid salt is potassium isethionate.

4. The process according to claim 1 wherein the 2-hydroxyalkane sulfonic acid salt is 2-hydroxypropane.

5. The process according to claim 1 wherein the 2-hydroxyalkane sulfonic acid salt is 2-hydroxy-2-butane.

6. The process according to claim 1 wherein the 2-hydroxyalkane sulfonic acid salt is 2-hydroxy-1-butane.

References Cited in the file of this patent

UNITED STATES PATENTS 2,093,576    Segessemann _____ Sept. 21, 1937

OTHER REFERENCES

Drinberg et al.: Chemical Abstracts, 48, 3896g (1954).
Aeloney: J. Am. Oil. Chemists Soc., 32, 170–2 (1955).